UNITED STATES PATENT OFFICE.

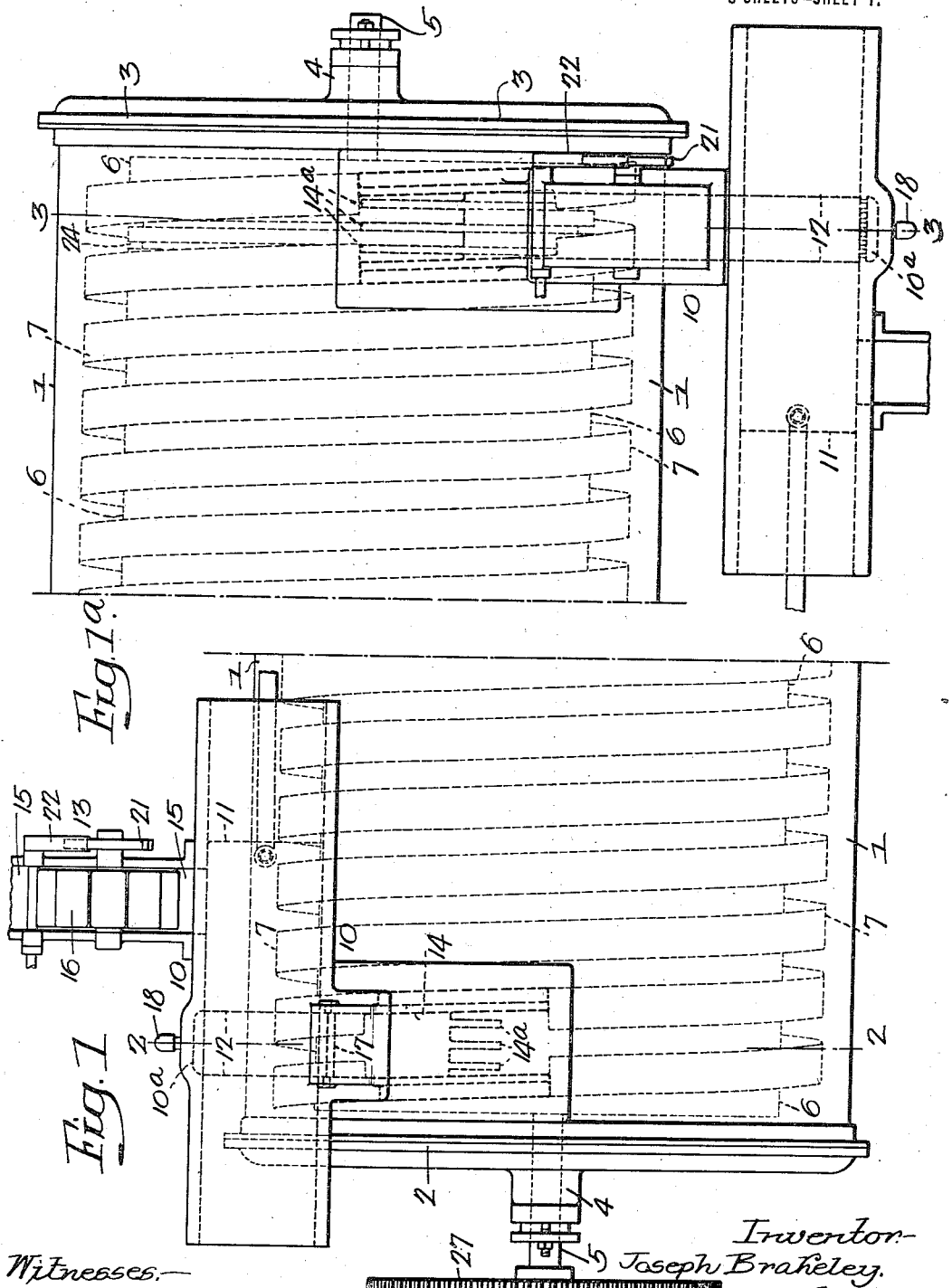

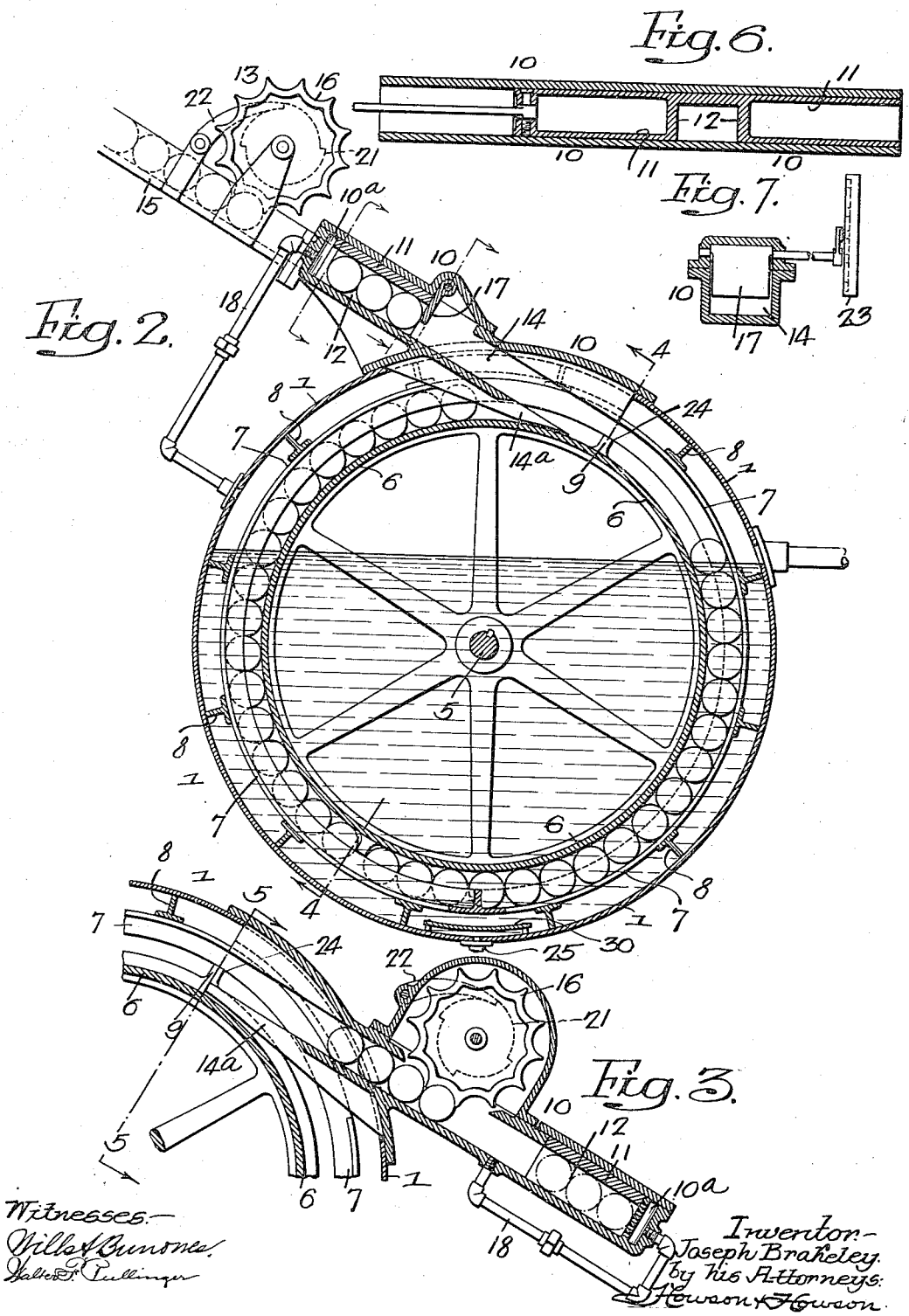

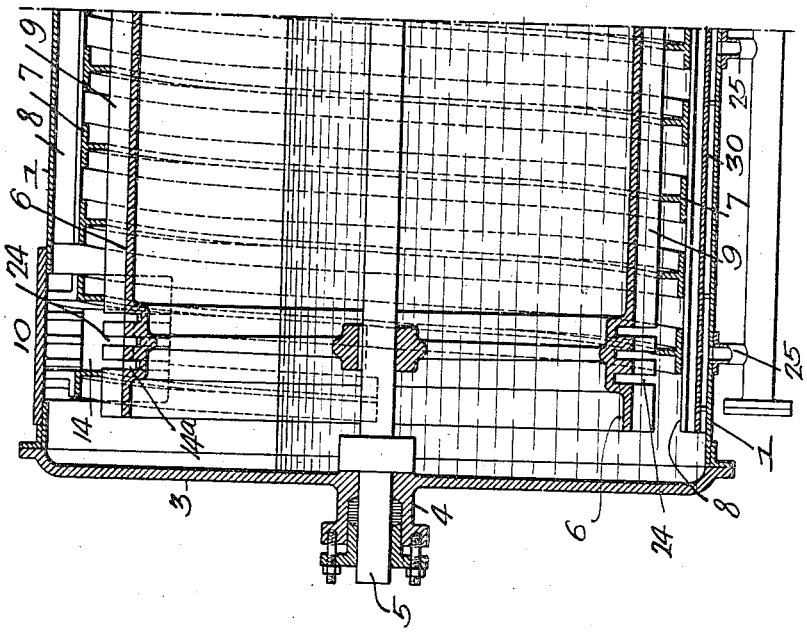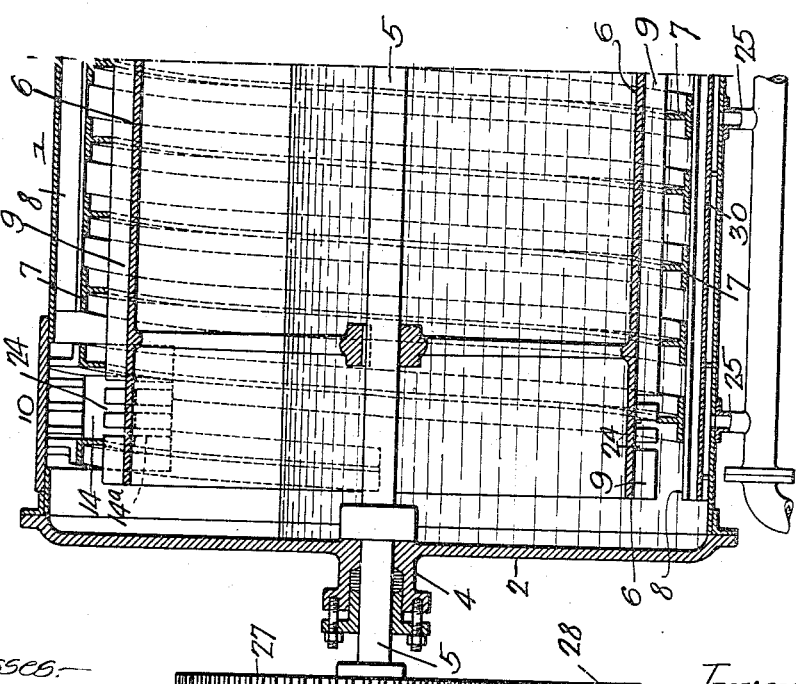

JOSEPH BRAKELEY, OF FREEHOLD, NEW JERSEY.

APPARATUS FOR COOKING CANNED VEGETABLES.

1,266,204.

Specification of Letters Patent.

Patented May 14, 1918.

Application filed February 23, 1915. Serial No. 9,924.

*To all whom it may concern:*

Be it known that I, JOSEPH BRAKELEY, a citizen of the United States, and a resident of Freehold, Monmouth county, New Jersey, have invented Improvements in Apparatus for Cooking Canned Vegetables, of which the following is a specification.

My invention relates to the canning of green vegetables which are cooked after they have been placed in the cans.

The object of my invention is to provide an apparatus in which this cooking can be carried on easily, quickly and with a minimum expenditure of heat for the amount of goods acted upon. The apparatus is designed to act continuously upon filled and sealed cans which are fed in at one end and discharged at the opposite end of a cylinder having an internal helical track along which the cans are continuously moved.

These and other features of my invention are more fully described hereinafter, reference being had to the accompanying drawings, in which:

Figure 1, is a plan view of the feed end of my improved apparatus;

Fig. 1ª, is a plan view of the discharge end of the same;

Fig. 2, is a sectional view on the line 2—2, Fig. 1;

Fig. 3, is a sectional view on the line 3—3, Fig. 1ª;

Fig. 4, is a sectional elevation of one end of the apparatus on the line 4—4, Fig. 2;

Fig. 5, is a sectional elevation of the opposite end of the apparatus on the line 5—5, Fig. 3, and Figs. 6 and 7, are views illustrating details of my invention.

In the drawings, 1 represents a suitable cylindrical chamber or boiler, having both ends closed by suitable plates 2 and 3, which are provided with stuffing boxes 4 for the reception of a shaft 5 whereby an internal drum 6 mounted within the chamber 1 and carried by said shaft may be driven.

Within the chamber a helical track is provided, consisting preferably of a plurality of sections or a continuous strip of T-iron 7 continuously laid from end to end of the structure, and secured to and spaced apart by longitudinal supporting members 8 of T-iron, which also serve to space the track from the wall of the chamber 1. The T-iron 7 forming the rails is so disposed as to provide between the central upstanding ribs of the same and the wall of the internal movable drum a space in which the cans may travel. In order that said cans may be moved continuously, the shell of drum 6 is provided with ribs or flanges 9 for engagement with the cans and designed to move the same on the helical track.

The cans are introduced to the helical track within the chamber at one end of the same, and for this purpose I provide special means to insure the proper movement of a plurality of cans at regular intervals without too great leakage of steam pressure within such chamber. The feeding means comprise a shell 10 secured to the chamber, and a sliding member 11 forming a valve and having a recessed portion 12 adapted to receive the cans from a suitable conveyer 13 and deliver them to a guide section 14 within the chamber, from which they pass directly to the helical track. The sliding valve member may be operated by a suitable cam or other means whereby it will be in position to deliver cans to the chamber at regular intervals. The cans are delivered from a runway 15 disposed at one side of the sliding member 11, and said cans are preferably controlled by suitable means, which may be a star wheel 16 of a similar feeding element so that the proper number will be fed to the sliding valve member 11 at regular intervals.

The shell 10 has a stop or retaining member for the cans fed by the sliding element to prevent them getting out of line before they are delivered to the guide section leading to the helical track, in the form of a pivotally mounted gate or flap 17 which may be externally controlled by suitable means to release the cans as soon as the slide has moved them into registry with said guide section. As the structure operates under pressure, there will, of course, be some slight escape of steam by the operation of the sliding member, but this is not sufficient to cause any appreciable loss. As the sliding valve is open to steam on one side or edge, it is desirable to balance the same, and this may be done by providing a steam space 10ª on the opposite side of the same which communicates with the interior of the chamber by a pipe 18.

The star wheel 16 controlling the delivery of cans to the valve structure has a ratchet wheel 21 with a pawl 22; the ratchet wheel having four teeth while the star wheel has twelve points or fingers, so that for every fourth revolution of the same, three cans will be fed to the valve structure. This star wheel is operated by the weight of the cans, means being provided to lift the pawl at regular intervals, and to drop the same immediately; the movement of such star wheel being limited by the pawl to the extent of one tooth of the ratchet.

An externally disposed trip 23 is employed with the gate or flap 17, and may be actuated by suitable means, operatively connected with the driving means for the internal drum, or the means for reciprocating the slide member.

At the discharge end of the apparatus substantially the same means are employed for the purpose of delivering the cans excepting that in this instance the casing having the valve structure and in communication with the steam space in the shell will also contain a star wheel for moving the cans from a runway leading from the helical track to the valve structure. Such valve structure, however, will be operated in the same manner as the valve structure controlling the inlet of the cans and may be balanced by bypassing the pressure from the interior of the chamber to the lower side or edge of the valve.

The means controlling the valves at the inlet and discharge ends of the structure are preferably coupled so that one set of cans will be discharged simultaneously with the entrance of another set to the apparatus, or the discharge may be slightly in advance of the inlet or entrance.

The flanges or ribs of the internal shell are notched or grooved at both ends of the same at 24 for the passage of fingers 14ª forming the bottoms of the runways receiving and delivering the cans at the feed and discharge ends thereof.

The cans discharged through the valved outlet are passed to a suitable conveyer and subsequently cooled.

Within the chamber the cooking may be effected by hot water and steam, or steam alone, which may enter the chamber at the bottom of the same at 25 adjacent the delivery end thereof, or at intervals at the bottom of the chamber; any overflow in the chamber being taken away at 26 (see Fig. 2) adjacent the feed end thereof, and in the case of steam alone, a suitable trap will be employed. I preferably maintain a pressure of about one atmosphere in order that the temperature within the chamber may be kept above the boiling point of water.

The inner drum is driven by any suitable means. The shaft carrying the same may have spiders upon which the drum is mounted, and this shaft is provided with a spur gear 27 at one end of the same which is driven from a suitable source of power by means of a pinion 28 mounted on a driving shaft.

When once the apparatus is started the process of cooking is a continuous one. By preference, the helical track is built outside the cylindrical structure on the longitudinal sections of T-iron, and the skeleton trackway so prepared is then slipped into place and suitably anchored so as to have no movement relatively to the outer shell or casing. As the cans are fed into one end of said track or runway, they will gradually fill up the same and will be carried forward by the flanges of the inner drum.

An important feature of my invention resides in the fact that by reason of the employment of flanges for the purpose of moving the cans, it is impossible to fill the track spaces between the flanges by feeding the cans in the manner shown and described; the time elapsing between the entrance of the several sets of cans giving the flanges such a range of movement as to prevent filling of the track spaces between the same. By reason of this condition, each of the cans is given an opportunity of rolling down the slope of the inner moving drum or cylinder after having been raised to the highest point by the flanges on the same.

This rolling of the cans permits the contents of the same to change their relative position between the center and the circumference of the can, thereby insuring a quicker heating of the contents than under conditions where no rotative movement is imparted to the can, and where the outer portion of the contents must be subjected to considerable heat before the central portion has the proper amount of heat imparted thereto. By the use of my apparatus, absolute sterilization of the food product is assured in the passage of the cans through the machine.

I preferably introduce the water or steam at the bottom of the shell through inlets 25, of which there may be as many as necessary or desirable from end to end of the shell, and in order that there will be no direct impingement of water or steam upon the cans at the bottom of the chamber which would tend to heat and cook them to an undue extent, I provide a baffle plate 30 which preferably extends from end to end of the shell.

It will be understood, of course, that mechanism for operating the various movable parts of my structure may be of any suitable or well known character designed to effect coördinate and synchronous movement of the various moving parts; whether they are rocked, rotated or reciprocated, in order that the cylinder may be actuated at a definite rate of speed and that delivery and discharge of the cans may be effected at regular intervals, in regular quantities, and with such intervening time periods as will insure a proper filling of the chamber and discharge of the same without choking the helical trackway or damaging in any way the cans moving along the same.

I claim:

1. In a can cooking or sterilizing apparatus, the combination of a cylindrical casing forming a steam chamber, a plurality of T-ribs secured to the inner wall of said steam chamber longitudinally of the same, a helical trackway mounted on said T-ribs and supported thereby inwardly from said inner wall of the casing, a rotatable drum concentrically disposed with respect to said casing and the trackway carried thereby; the latter being arranged to receive cans at one end of the machine and to discharge them at the opposite end of the machine, means for effecting movement of the rotatable member, a pair of oppositely disposed ribs carried by said rotating member for engagement with the cans whereby the latter may be moved through the steam chamber around the helical trackway; said ribs being so spaced with reference to the cans occupying the trackway that the surface of the rotatable member between said ribs will not be completely covered by the cans, thereby permitting the cans to have rolling movement in the trackway after they are carried to the top of said rotatable member independent of that imparted by the ribs; thereby permitting the contents of the cans to change position with reference to the wall of the same, and valved means at each end of the casing providing for inlet of cans simultaneous with the discharge of the same.

2. In a can cooking or sterilizing apparatus, the combination of a cylindrical casing forming a steam chamber, a helical track extending from end to end of the casing along which cans may be moved; said track being spaced from the wall of the casing, a rotatable cylinder concentrically disposed with respect to said track and delimiting the space for the passage of cans; said track being arranged to receive cans at one end of the casing and deliver them at the other end of the casing, a pair of oppositely disposed ribs carried by said rotating cylinder for engagement with the cans whereby they may be moved around the helical trackway; each end of said ribs being provided with slots or notches, valved means for effecting delivery to and discharge of cans from the steam chamber, and runways for the cans coöperating with said valved means and extending into the casing; said runways having slotted bottom plates registering with the notches or slots of said ribs.

In testimony whereof I have signed my name to this specification in the presence of two subscribing witnesses.

JOSEPH BRAKELEY.

Witnesses:
MURRAY C. BOYER,
WM. A. BARR.